H. M. FISK.
VEHICLE RIM AND TIRE.
APPLICATION FILED AUG. 18, 1917.

1,312,506. Patented Aug. 5, 1919.

Witness:
Harry S. Gaither

Inventor
Henry M. Fisk
By Chamberlin Freudenreich
Attys ed to hook under the rim flanges 2 and 3;

UNITED STATES PATENT OFFICE.

HENRY M. FISK, OF CHICAGO, ILLINOIS; NELLIE A. FISK ADMINISTRATRIX OF SAID HENRY M. FISK, DECEASED.

VEHICLE RIM AND TIRE.

1,312,506.   Specification of Letters Patent.   Patented Aug. 5, 1919.

Application filed August 18, 1917. Serial No. 186,837.

*To all whom it may concern:*

Be it known that I, HENRY M. FISK, a citizen of the United States, residing at Chicago, county of Cook, State of Illinois, have invented a certain new and useful Improvement in Vehicle Rims and Tires, and declare the following to be a full, clear, and exact description of the same, such as will enable others skilled in the art to which it pertains to make and use the same, reference being had to the accompanying drawings, which form a part of this specification.

My invention has for its object to produce a simple demountable vehicle rim and tire of the pneumatic variety which shall have riding qualities equal to or better than the ordinary pneumatic tire, shall be practically immune to puncture, be more durable and possess longer life than the best types of the ordinary pneumatic tire, while permitting the use of less rubber or inferior grades of rubber or other material than rubber in the wearings parts.

The various features of novelty whereby my invention is characterized will hereinafter be pointed out with particularity in the claims; but, for a full understanding of my invention and of its objects and advantages, reference may be had to the following detailed description taken in connection with the accompanying drawing, wherein:

Figure 1:
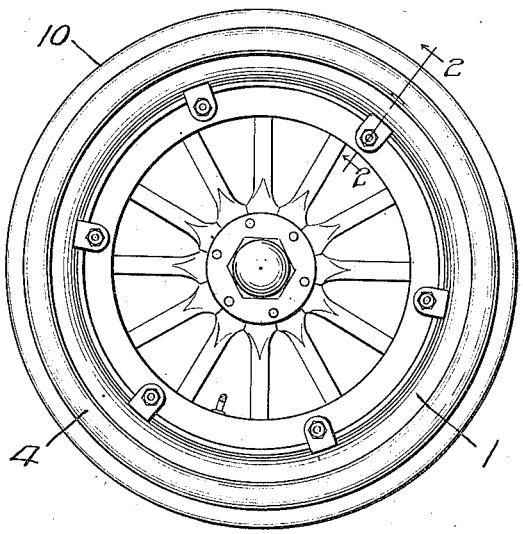
Figure 1 is a side elevation of a vehicle wheel having therein a tire embodying the present invention in a preferred form.

Referring to the drawing, 1 represents a deep U-shaped demountable rim having clencher flanges, 2 and 3, directed inwardly from the outer rim edges. The outer portion, 4, of one of the sides of the rim is preferably made detachable so as to facilitate the placing in position and the removal of the tire to be hereinafter explained. The part 4 may conveniently be fastened to the rim proper by providing it with a groove, 5, in its inner edge, and notching the inner bounding wall of the groove and the edge of the rim body to form teeth, 6 and 7; the teeth being so proportioned that the two rim parts may be assembled by bringing them together laterally with the teeth in one registering with the spaces between the teeth in the other, thus bringing the edge of the body of the rim into the groove 5, and then turning the parts through a small angle to cause the two sets of teeth to overlap each other.

Figure 2:
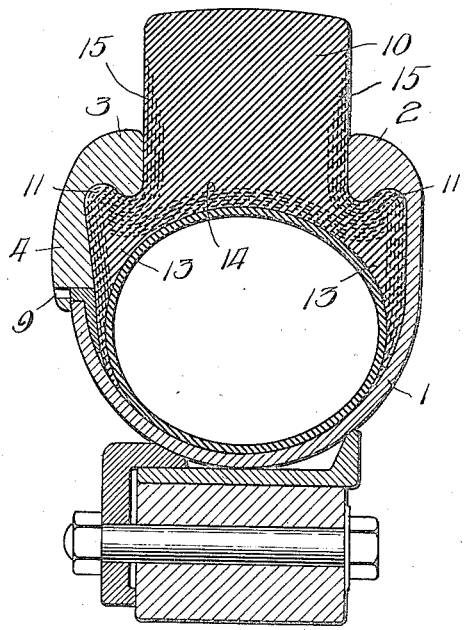
Fig. 2 is an enlarged section on line 2—2 of Fig. 1.
Figure 3:
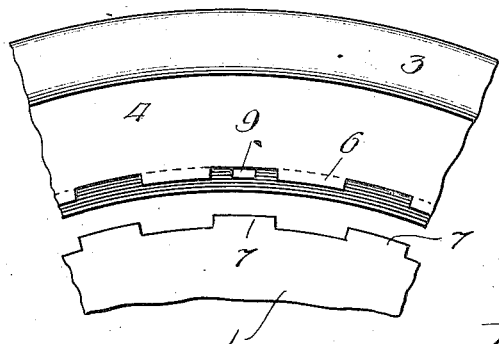
Fig. 3 is a view of a fragment of the rim, looking outwardly toward the inner face of that side of the rim having a detachable section, the latter being shown detached from the rim proper.
Figure 4:
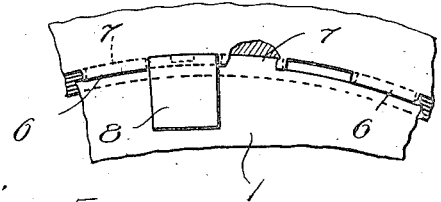
Fig. 4 is a view similar to Fig. 3, showing the two parts of the rim connected together and the locking dog in place.
Figure 5:
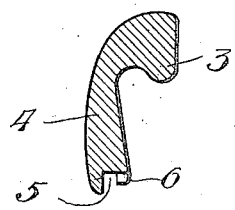
Fig. 5 is a transverse section through the detachable part of the rim.

The two rim parts may be locked together in any suitable way. In the arrangement shown, a little L-shaped dog, 8, is provided, the dog having a width equal to the length of the space between two of the teeth 7. When the rim parts have been assembled, the dog is placed as shown in Figs. 2 and 4 with the short arm extending between two of the teeth 6 and two of the teeth 7, the long arm of the dog lying against the inner face of the short side of the rim. The outer bounding wall for the groove, 5, is provided with an opening, 9, situated opposite the space between two of the teeth, 6; the purpose being to permit the insertion of a pin or tool from the exterior in order to push the dog out of locking position.

The tire comprises a heavy outer solid tread portion, 10, approximately rectangular in cross section and preferably thicker in the radial direction than in the transverse direction, having clencher flanges, 11, adapted to hook under the rim flanges 2 and 3; together with an inner pneumatic cushion in the form of a tube, 12, which may either be separate from the tread portion or be attached thereto or form a part thereof. The tread portion preferably has wings, 13, extending down from the clencher parts, 11, these wings decreasing gradually in thickness to thin edges. The under side of the tread member, with the wings, forms a concave seat or trough approximately semi-circular or semi-elliptical in cross section. Consequently the pneumatic cushion, when air is pumped in, expands just like the inner tube of the ordinary pneumatic tire and presses the parts 11 firmly into interlocking engagement with the rim flanges 2 and 3.

Where the tread member of the tire is made of rubber it is preferably reinforced by layers of fabric extending through the same. Thus, in the arrangement shown, there are four or five layers of fabric, 14, extending across the base of the tread member and four or five additional layers, 15, extending down each side of the tread member and into the wings, 13. Mechanical strength is thus given to the tire and, at points where wear due to a rubbing action could take place, tough wear-resisting material is provided.

The pneumatic cushion preferably lies well within the trough-shaped rim so that it will be substantially impossible to puncture it from without.

It will be seen that the tire may readily be placed on the rim or be removed therefrom in the lateral direction if the detachable section of the rim is first taken off so as to lower the height of one side of the rim.

The rim and its tire are a complete demountable unit which may be substituted for demountable rims and tires now in common use. Furthermore, if the rim is rounded in the trough thereof, as shown, it will be very easy to put it on and take it off.

While I have illustrated and described only a single preferred form of my invention, I do not desire to be limited to the exact details thus illustrated and described; but intend to cover all forms and arrangements which fall within the terms of the definitions of my invention, constituting the appended claims.

I claim:

1. In combination, a U-shaped rim having clencher flanges at the edges thereof, a tire on the rim comprising an inner tube lying wholly in the trough of the rim and a tread member substantially square in cross section extending outwardly between said clencher flanges and having lateral extensions interlocking with the flanges and radially extending wings at the edges of said lateral extensions, the flanges being thickened in the radial direction to form comparatively deep parallel guide faces lying wholly beyond the pneumatic tube, the tread member having reinforcing fabric extending through the same in layers lying adjacent to and approximately parallel with the sides of the body portion and the sides of the wings, and additional reinforcing fabric extending substantially straight across the tread member from one of said lateral extensions to the other.

2. In combination, a U-shaped rim having clencher flanges at the edges thereof, an approximately rectangular tread member lying between said flanges, said tread member having lateral clencher flanges and radially extending wings at the edges of the clencher flanges; the inner faces of the tread member, including the clencher flanges and the wings forming with the trough of the tire an inclosed annular space the outer portion of which is substantially semi-circular in cross section so disposed that the clencher flanges on the tread member are approximately symmetrically disposed with respect to radii extending from the center of said semi-circular space, and a pneumatic tube within said space.

3. In combination, a U-shaped rim having clencher flanges at the edges thereof, a tire on the rim comprising a pneumatic cushion housed wholly within the trough of the rim, and a thick tread member extending out beyond the rim and having parts interlocked with said flanges, a continuous narrow annular section on one side of the rim, including the corresponding clencher flange, being detachable to permit the ready removal of the tread member when the pneumatic cushion is deflated, and the clencher flange on the opposite side of the rim being integral with the rim.

In testimony whereof I sign this specification.

HENRY M. FISK.